May 7, 1963
H. C. MANDELL, JR
3,088,808
FLAME PHOTOMETRY
Filed Oct. 28, 1957
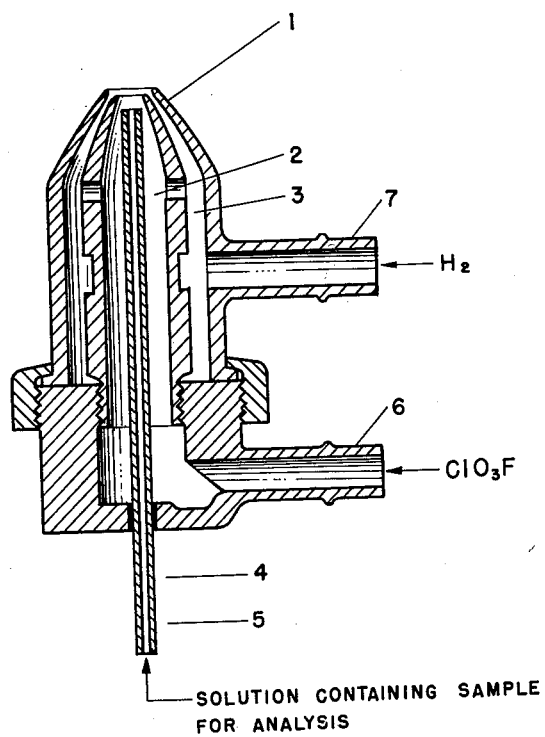
HARRY CRESTON MANDELL, JR. INVENTOR.
BY *Arvid E. Lyden*
Attorney

United States Patent Office 3,088,808
Patented May 7, 1963

3,088,808
FLAME PHOTOMETRY
Harry Creston Mandell, Jr., Abington, Pa., assignor to Pennsalt Chemicals Corporation, Philadelphia, Pa., a corporation of Pennsylvania
Filed Oct. 28, 1957, Ser. No. 692,879
7 Claims. (Cl. 23—230)

This invention relates to a method of flame photometry with a novel flame source. More particularly it relates to a hydrogen-perchloryl fluoride flame and the method of flame photometry based on its use.

Flame photometry is a rather recent development in the field of analytical chemistry and involves the measurement of the intensity of the energy emitted by ions and molecules of metallic compounds excited in a flame. The fundamental ideas involved are not new, being adapted from spectroscopic methods using other light sources. Flame photometry provides a rapid and relatively simple method for the analysis of a wide variety of mixtures. Qualitative and quantitative analysis for ions and molecules of metallic compounds in a material are made by atomizing a solution of the compound or compounds into the flame of the photometer and measuring the energy emitted for the wavelengths characteristic of the elements of interest. In the case of quantitative determinations the data are compared with data obtained using a standardized solution of a particular compound. Since only a relatively small amount of energy as compared to that in a spark or arc is available in a flame, the excited ions and molecules do not emit a large number of lines. This makes the isolation of the desired lines quite simple. Ions and molecules of compounds of at least forty elements can be excited in a hot flame and distinguished qualitatively by a flame photometer. Flame photometry as commonly practiced is an exceedingly rapid and sensitive procedure for the quantitative determination of a few metals, mainly the alkali metals and the alkaline earth metals with the exception of beryllium, calcium and magnesium.

The light source in all types of spectroscopic analysis serves a two-fold purpose, as means, first, of vaporizing and dissociating the sample, and, second, of exciting the atoms to radiate their characteristic spectra. Both factors are important to the development of the intensities of spectral lines. In flame photometry the flame is the sole light source. Standard flame sources for the investigation of flame spectra of solutions of metallic ions by the process of flame photometry are oxidant-fuel systems, particularly acetylene-oxygen, hydrogen-oxygen and acetylene-air gaseous mixtures.

One weakness of the above standard oxidant-fuel systems is their failure, due to the relatively low temperature of their flames (3500° K. or less), to excite more than a few kinds of ions and molecules in the parts per million concentration range in atomized solutions. However, a more significant weakness is that these flames give rise to refractory oxide broad band spectra in the presence of alkaline earth and other metals. The detrimental effect of the broad oxide band spectra is that discrete lines and bands of elements and molecules present in the area of the oxide band spectra are obscured, making the determination and identification of the elements involved difficult. Examples of such refractory oxides are $Al_2O_3$, $Fe_3O_4$, CaO, MgO, $Cr_2O_3$, etc. Broad band spectra may cover a width from 20 to 100 or more times that of a discrete line of an element. In particular, magnesium and calcium cannot be determined satisfactorily by these commonly used flames. More recently, a hydrogen-fluorine flame (about 4000° K.) has been found to give spectral results many times more intense than those obtained excited by the standard flame sources and, since no oxygen is used, free of the broad oxide band spectra ("Mechanism of Spectral Excitation of Metallic Ions by a New High Temperature Source," H. E. Collier, Dissertation Abstracts, vol. XV, No. 9, October 1955, p. 1504).

The spectra of magnesium, chromium and aluminum, which are very poor or non-existent in standard flames, are exceptionally intense in the hydrogen-fluorine mixture. Many elements which formerly could not be detected or quantitatively determined may now be identified. Thus, determination of magnesium and calcium in such materials as ores, cement, limestone, bio-materials, and alloys which formerly was accomplished only by long, tedious and expensive gravimetric and colorimetric methods is now possible by flame photometry.

Although the introduction of the hydrogen-fluorine flame as a flame source into the field of flame spectroscopy has enlarged the scope of flame photometry as to the number of compounds which can be detected, as well as to the sensitivity of each quantitative determination, the usefulness of the hydrogen-fluorine flame source is impaired by the dangers associated with the handling of fluorine in the environment of a spectroscopic laboratory. Fuorine as the oxidant of a flame source for flame photometry has the disadvantage of being highly dangerous if it comes in contact with an organic material, reacting so violently as to ignite the material. This disadvantage is partciularly significant in connection with the selection of solvents for use in the preparation of samples for examination in a hydrogen-fluorine flame. In addition to the potential hazard involved, organic solvents, which are often preferred for flame photometry work, cannot be used in the presence of the hydrogen-fluorine flame because such use results in sputtering and other erratic flame characteristics. Moreover, since fluorine, under some circumstances, can support the combustion of copper and other metals as well as steel, the use of fluorine in a photometer burner poses a problem of materials of construction for the portions of the photometer exposed to fluorine, particularly in the vicinity of the high temperatures encountered when the hydrogen-fluorine flame is used.

I have now found a new oxidant-fuel composition for use in the process of flame photometry which is both safer and more convenient to handle than oxidant-fuel compositions based on fluorine and which, furthermore, is substantially as efficient as fluorine, providing a flame in the temperature range of 3500° K. to 4000° K. without forming broad oxide band spectra of refractory metal oxides as is done by the acetylene-oxygen flame. Additionally, my novel composition provides a flame which has unexpected advantages over the hydrogen-fluorine flame in that it can be used when organic solvents are used for the preparation of solutions of materials to be analyzed. My novel oxidant-fuel composition comprises perchloryl fluoride and a gaseous fuel, preferably hydrogen. Other fuels, such as acetylene, natural gas, mixtures of natural and manufactured gases and manufactured gas may also be used when perchloryl fluoride is the oxidant.

The oxidant of my present invention, perchloryl fluoride, ($ClO_3F$), a derivative of perchloric acid is a colorless gas at ordinary temperatures. It is available commercially. When liquefied, it boils at —47.5° C. at 760 mm. pressure. It solidifies to a white crystalline solid at —146° C. Perchloryl fluoride is thermally stable up to high temperatures.

Chemically, perchloryl fluoride is a strong oxidant which vigorously supports combustion, but which, surprisingly, does not spontaneously ignite many common organic materials at room temperatures as readily as do other strong oxidants such as fluorine and chlorine trifluoride. In this respect, perchloryl fluoride is safer to handle than these other oxidant materials, particularly in a spectroanalytical laboratory.

Another important advantage of perchloryl fluoride as an oxidant for flame photometry is that perchloryl fluoride has a relatively low pressure at ordinary temperatures (about 150 p.s.i. at 75° F.) and is capable of undergoing permanent storage as a liquid in ordinary steel cylinders without loss or deterioration. The physical and chemical properties of perchloryl fluoride thus make it a remarkably useful and valuable material as an oxidant material for flame photometry. Other oxidant uses of perchloryl fluoride, e.g. as an oxidant in cutting and working of structural materials, are disclosed and claimed in copending application of J. F. Gall, Serial No. 564,830, filed February 10, 1956, now abandoned.

In the practice of my invention, perchloryl fluoride is mixed and burned with hydrogen substantially in the proportion of at least 2 moles of hydrogen to 1 mole of perchloryl fluoride. A solution of a sample of metallic compound of unknown metallic ion content is introduced into the hydrogen-perchloryl fluoride flame whereby the ions and molecules of said compound are excited to higher energy levels. The intensities of energy emitted are measured for the wave lengths characteristic of the ions and molecules of interest, and in the case of quantitative determinations, compared with calibrated standards.

The single figure in the drawing shows a sectional side elevation of the burner of a flame photometer.

The hydrogen and perchloryl fluoride may be burned in several varieties of burner, but the concentric type has proved very satisfactory and is preferred. The solution containing the material to be analyzed for metallic elements may be atomized into the flame by a variety of methods; however, the method of introducing the solution into the center of the hydrogen-perchloryl fluoride gas stream at the tip of the concentric type burner by means of a capillary tube integral with said burner has worked successfully and is preferred. As shown in the drawing, the burner tip 1 is provided with an inner passage and mixing chamber 2, an outer passage 3 and a capillary tube 4 with a passage 5. Perchloryl fluoride gas is supplied to the inner passage 2 through inlet connection 6 which is connected by a flexible connection, not shown, to a storage tank of perchloryl fluoride. Hydrogen is supplied to the outer passage 3 through inlet connection 7 which is connected by a flexible connection, not shown, to a storage tank of hydrogen. The solution of material to be atomized is supplied to the flame through the capillary tube 4, the lower opening of which is dipped into a container holding a quantity of solution at the time that the analysis is ready to be made. As with a burner used with a hydrogen-fluorine flame, it is preferable to use a monel capillary tube rather than the standard steel-palladium type supplied by the instrument manufacturer.

The flow of perchloryl fluoride and hydrogen may be controlled by a variety of gas flowmeters and pressure regulating devices. The procedures used in making an analysis follow, in general, the standard procedures of flame photometry. See for example "Instrumental Methods of Analysis," Willard et al., 2nd Edition (1951), pp. 77–84. A flow rate of 4–5 l./minute of perchloryl fluoride and of about 11–12 l./minute of hydrogen has been found to provide an optimum flame for use in a standard type flame photometer burner. The amounts of the gases may be varied to fit the burner size. The proportion of gases may be adjusted as necessary for a particular burner and the material being analyzed. For example, proportions of from about 2:1 to about 4:1 of hydrogen to perchloryl fluoride may readily be used. A hydrogen pressure of 8–10 p.s.i. g. has been found advantageous.

It is fundamental in flame photometry to introduce the metallic compound into the flame in the form of an atomized solution. Water or organic solvents are commonly used. Since energy is consumed in vaporization of the solvent, and organic solvents have lower heats of vaporization than water, organic solvents are preferred over water whenever the sample to be examined can be dissolved in an organic solvent. Furthermore, organic solvents can be selected which are free of or low in combined oxygen and which therefore emit a weaker oxide spectra background than is obtainable with water. The solvent does not affect the type of radiation observed for a particular element, but the organic solvents produce higher intensities than water solvent under similar conditions.

Organic solvents cannot be used with a hydrogen-fluorine flame source for flame photometry because of the erratic and explosive reactivity of fluorine with organic compounds in the flame. I have found that organic solvents unexpectedly can be used advantageously with a hydrogen-perchloryl fluoride flame. For example, not only water, but dimethylformamide, dimethylsulfoxide, or a mixture of glacial acetic acid and chloroform in the proportion of 1:1 by volume may readily be used to dissolve samples of metallic compounds, prepared in the form of halides, which are to be atomized into a hydrogen-perchloryl fluoride flame according to my invention. Thus the oxidant-fuel system of my invention permits the analysis by flame photometry of many materials which may be prepared in a form soluble in organic solvents but which, in the first case, cannot be determined in the hydrogen-fluorine flame using an organic solvent because of the hazard and disadvantages involved, nor in the second case, cannot be satisfactorily excited in the acetylene-oxygen type of flame because of the formation of the broad refractory oxide band spectra.

The concentrations of the solutions used in analyzing materials by means of the hydrogen-perchloryl fluoride flame are those commonly used in flame photometry. A concentration of 1000 p.p.m. by weight of metallic element represents an advantageous upper limit.

Whereas as many as 43 elements (Ag, Au, B, Ba, Bi, Ca, Cd, Co, Cr, Cs, Cu, Dy, Eu, Fe, Ga, Gd, Hg, In, K, La, Li, Mg, Mn, Mo, Na, Nd, Ni, Pb, Pd, Pr, Pt, Rb, Rh, Ru, Sc, Se, Sm, Sn, Sr, Te, Tl, Y and Zn) can be excited to varying degrees of intensity even by an acetylene-oxygen gas flame not all elements can be excited to an equally useful degree by it or other common flame sources because ions and molecules of different substances differ in the energy required to vaporize, dissociate and excite the atoms to radiate their characteristic spectra. The hydrogen-perchloryl fluoride flame used in practicing the process of my invention is useful not only for exciting the above listed elements, but it is particularly useful for the excitation of those ions and molecules which require a very high temperature (about 3500–4000° K.) to properly excite them. Included among such elements are Ba, Ca, Cr, Cu, Fe and Sr. Besides being properly excited by the hydrogen-perchloryl fluoride flame, the spectra obtained are not masked by strong oxide band spectra as is the case with the acetylene-oxygen flame.

In the excitation of ions and molecules of metallic compounds with a hydrogen-perchloryl fluoride flame it is to be expected that because of the high oxygen content of perchloryl fluoride (46.8%) that oxide bands of refractory metal oxides, such as those of CaO and MgO, would be formed and would obscure the electronic line and molecular halide band intensities of the spectra, rendering the hydrogen-perchloryl fluoride flame useless for more than the production of broad spectra. Unexpectedly it was found that oxide bands were almost entirely absent and not more than a minor interference from metal oxide bands was obtained. Whereas an acetylene-oxygen flame produces primarily atomic line and metal oxide band radiation and a hydrogen-fluorine flame produces primarily atomic line and metal fluoride band radiation for the elements studied, the hydrogen-perchloryl fluoride flame was found to produce primarily atomic line and metal fluoride and chloride radiation and only a minor amount of metal oxide band radiation. Thus, my hydrogen-perchloryl fluoride flame is capable of producing the same type of radiation as that produced by the hydrogen-fluorine flame. The significance of this discovery is that a new oxidant-fuel mixture, capable of forming a flame intermediate in temperature between that of an acetylene-oxygen flame and of a hydrogen-fluorine flame, without the inherent disadvantages present in a hydrogen-fluorine flame source and without the oxide band spectra background of the acetylene-oxygen flame has been found and is now made available for use in flame photometry, particularly for the quantitative determination of calcium and magnesium.

The following examples are presented for the purpose of illustrating the invention, it being understood that the invention is not intended to be restricted to the specific illustrative examples and that other specific modifications are included by the invention.

EXAMPLE 1

Solutions were prepared of chlorides of Ba, Ca, Cr, Cu, Fe, Li, Mg, Na and Sr in the concentration of 1000 p.p.m. of the metal ion, using both water and organic solvents. The 1000 p.p.m. concentration was chosen because it would allow reasonable detection of radiation other than the resonance lines.

The data shown in the following Tables 1–9 were obtained using a standard Beckman Instruments, Inc., Model No. DU spectrophotometer adapted for flame photometry with a Model 9200 flame attachment in accordance with the manufacturer's instructions.

The standard acetylene-oxygen burner supplied by Beckman Instruments, Inc. was fitted with a monel capillary tube. The burner was mounted in place of the light source of the monochromator unit and the latter was coupled with an automatic recording unit. A drum speed of 2 was selected to permit accurate and rapid recording of the various spectra. A sensitivity setting of 6 and a slit width of 0.05 mm. to 0.4 mm. were used. The distance from the burner to the lamp housing was 8 inches.

The symbols used in the following tables are defined as follows.

Intensities:
    V.S.—Very strong (off scale)
    S—Strong (full scale)
    M—Moderate (half scale)
    W—Weak (but still effective)
    —, absent Solvents:
    $H_2O$—Water
    DMF—Dimethylformamide
    DMS—Dimethylsulfoxide
    HAC—Glacial acetic acid and chloroform, 1:1 by volume In the tables, the results obtained by use of the hydrogen-perchloryl fluoride flame have been compared with results obtained on substantially the same instrument with the same materials and procedures using a hydrogen-fluorine flame and an acetylene-oxygen flame. It is to be noted that the intensities obtained by the hydrogen-perchloryl fluoride flame ($H_2+ClO_3F$) are but slightly less intense than those obtained with the hydrogen-fluorine flame ($H_2+F_2$) and the acetylene-oxygen flame $$(C_2H_2+O_2)$$

Also, the almost complete absence of oxide bands should be noted in the data for the hydrogen-perchloryl fluoride flame. In contrast, the predominance of broad interfering molecular oxide bands is to be noted when the acetylene-oxygen flame is used. No data are shown for organic solvents with the $H_2+F_2$ flame, since none are possible.

*Table 1*

$BaCl_2 \cdot 6H_2O$

[Conc., 1,000 p.p.m.]

| Flame | $H_2+F_2$ | $H_2+ClO_3F$ | | | $C_2H_2+O_2$ | | |
|---|---|---|---|---|---|---|---|
| Solvent | $H_2O$ | $H_2O$ | DMF | DMS | $H_2O$ | DMF | DMS |
| Wave length, A.: | | | | | | | |
| Atomic lines: | | | | | | | |
| 5535.6 Ba | W | W | W | W | M | M | S |
| 4934.1 Ba | Under band | Under band | Under band | Under band | W | W | M |
| 4554.0 Ba | W | W | W | W | W | W | W |
| Molecular bands: | | | | | | | |
| 5086.6 BaO | — | — | — | — | W | W | W |
| 4850.6 BaO | — | — | — | — | W | W | W |
| 5130 BaF | W | M | M | W | — | — | — |
| 5000.6 BaF | M | W | W | W | — | — | — |
| 4950.8 BaF | S | W | W | W | — | — | — |

*Table 2*

$CaCl_2$

[Conc., 1,000 p.p.m.]

| Flame | $H_2+F_2$ | $H_2+ClO_3F$ | | | | $C_2H_2+O_2$ | | | |
|---|---|---|---|---|---|---|---|---|---|
| Solvent | $H_2O$ | $H_2O$ | DMF | DMS | HAC | $H_2O$ | DMF | DMS | HAC |
| Wave length A.: | | | | | | | | | |
| Atomic lines: | | | | | | | | | |
| 4226.7 Ca | V.S. | W | M | M | W | V.S. | V.S. | V.S. | V.S. |
| 3968.5 Ca | W | W | W | W | W | W | W | W | W |
| 3933.7 Ca | M | W | W | W | W | W | M | M | M |
| Molecular bands: | | | | | | | | | |
| 6362 CaO | — | — | — | — | — | W | M | M | W |
| 6258.5–6318 CaO | — | — | M | M | M | V.S. | V.S. | V.S. | V.S. |
| 5473–5560 CaO | — | — | M | M | M | V.S. | V.S. | V.S. | V.S. |
| 6051.6–6353.5 CaCl | — | S | S | S | S | — | — | — | V.S. |
| 5934.0 CaCl | — | M | M | M | M | — | — | — | M |
| 6256.6–6285.3 CaCl | M | — | — | — | — | — | — | — | — |
| 6036.9–6064.4 CaF | V.S. | S | V.S. | V.S. | V.S. | — | — | — | — |
| 5830 CaF | S | W | M | M | M | — | — | — | — |
| 5291.0–5298.6 CaF | V.S. | M | S | M | M | — | — | — | — |

Table 3

CrCl₃·6H₂O

[Conc., 1,000 p.p.m.]

| Flame | $H_2+F_2$ | $H_2+ClO_3F$ | | | | $C_2H_2+O_2$ | | | |
|---|---|---|---|---|---|---|---|---|---|
| Solvent | $H_2O$ | $H_2O$ | DMF | DMS | HAC | $H_2O$ | DMF | DMS | HAC |
| Wave length A.: Atomic lines: | | | | | | | | | |
| 5208.4 Cr | M | — | W | W | W | W | M | M | M |
| 4289.7 Cr | S | W | W | M | W | W | M | M | M |
| 4274.8 Cr | V.S. | W | W | M | W | M | M | M | M |
| 4254.3 Cr | V.S. | W | W | M | W | M | M | M | M |
| 3605.3 Cr | M | — | W | W | W | W | W | M | W |
| 3593.5 Cr | M | — | W | W | W | W | W | M | M |
| 3578.7 Cr | M | — | W | W | W | W | W | M | M |

Table 4

CuCl₄

[Conc., 1,000 p.p.m.]

| Flame | $H_2+F_2$ | $H_2+ClO_3F$ | | | $C_2H_2+O_2$ | | |
|---|---|---|---|---|---|---|---|
| Solvent | $H_2O$ | $H_2O$ | DMF | DMS | $H_2O$ | DMF | DMS |
| Wave length, A.: Atomic lines: | | | | | | | |
| 5782.1 Cu | W | — | — | — | — | — | — |
| 5105.5 Cu | W | — | — | — | W | W | W |
| Molecular bands: | | | | | | | |
| 4433.8 CuCl | — | W | W | W | — | — | — |
| 4353.8 CuCl | — | W | W | W | — | — | — |
| 4280.9 CuCl | — | W | W | W | — | — | — |
| 5685.7 CuF | W | — | — | — | — | — | — |
| 5061.1 CuF | W | — | W | W | — | — | — |
| 4932.0 CuF | M | — | W | W | — | — | — |

Table 5

FeCl₃·6H₂O

[Conc., 1,000 p.p.m.]

| Flame | $H_2+F_2$ | $H_2+ClO_3F$ | | | | $C_2H_2+O_2$ | | | |
|---|---|---|---|---|---|---|---|---|---|
| Solvent | $H_2O$ | $H_2O$ | DMF | DMS | HAC | $H_2O$ | DMF | DMS | HAC |
| Wave length, A.: Atomic lines: | | | | | | | | | |
| 4380 Fe | W | — | W | W | W | W | W | W | W |
| 4045 Fe | W | — | W | W | W | W | W | W | W |
| 3930 Fe | W | W | W | W | W | W | W | W | W |
| 3900 Fe | W | — | W | W | W | W | W | W | W |
| 3890 Fe | W | W | W | W | W | W | W | W | W |
| 3860 Fe | M | W | W | W | W | W | M | M | M |
| 3830 Fe | W | W | W | W | W | W | W | W | W |
| 3755 Fe | M | W | W | W | W | W | M | M | M |
| 3740 Fe | M | W | W | W | W | M | M | M | M |
| 3720 Fe | V.S. | W | W | W | W | M | M | M | M |
| 3580 Fe | M | — | W | W | W | W | W | W | W |
| 3570 Fe | M | — | W | W | W | W | W | W | W |

Table 6

LiCl

[Conc., 1,000 p.p.m.]

| Flame | $H_2+F_2$ | $H_2+ClO_3F$ | | | | $C_2H_2+O_2$ | | | |
|---|---|---|---|---|---|---|---|---|---|
| Solvent | $H_2O$ | $H_2O$ | DMF | DMS | HAC | $H_2O$ | DMF | DMS | HAC |
| Wave length A.: Atomic lines: | | | | | | | | | |
| 6707.8 Li | V.S. | V.S. | S | S | S | V.S. | V.S. | V.S. | V.S. |
| 6103.6 Li | M | W | — | W | W | W | S | S | M |
| 4972.0 Li | — | — | — | — | W | — | W | W | W |
| 4602.9 Li | M | — | — | — | — | — | M | M | W |
| 4132.3 Li | — | — | — | — | — | — | W | W | W |
| 3915.0 Li | — | — | — | — | — | — | W | W | — |

Table 7

MgCl$_2$.6H$_2$O

[Conc., 1,000 p.p.m.]

| Flame | H$_2$+F$_2$ | H$_2$+ClO$_3$F | | | C$_2$H$_2$+O$_2$ | | |
|---|---|---|---|---|---|---|---|
| Solvent | H$_2$O | H$_2$O | DMF | DMS | H$_2$O | DMF | DMS |
| Wave length, A.: | | | | | | | |
| Atomic lines: | | | | | | | |
| 5183.6 Mg | W | – | – | – | W | – | – |
| 3838.3 Mg | W | – | – | – | – | – | – |
| Molecular bands: | | | | | | | |
| 4920–5007.3 MgO | – | – | W | W | W | W | W |
| 3795–3860 MgO | – | – | – | – | W | M | M |
| 3680–3730 MgO | – | – | M | M | W | M | M |
| 3830 MgCl | – | – | – | – | – | – | – |
| 3783 MgCl | – | M | S | S | – | – | – |
| 3770 MgCl | – | M | S | M | – | – | – |
| 3700 MgCl | – | M | M | – | – | – | – |
| 3665 MgF | M | W | – | – | – | – | – |
| 3594.2 MgF | V.S. | M | M | M | – | – | – |
| 3490 MgF | M | W | W | W | – | – | – |

Table 8

NaCl

[Conc., 1,000 p.p.m.]

| Flame | H$_2$+F$_2$ | H$_2$+ClO$_3$F | | C$_2$H$_2$+O$_2$ | |
|---|---|---|---|---|---|
| Solvent | H$_2$O | H$_2$O | DMS | H$_2$O | DMS |
| Wave length A.: | | | | | |
| Atomic lines: | | | | | |
| 5890 Na | V.S. | V.S. | V.S. | V.S. | V.S. |
| 5688.2 Na | W | – | – | – | W |
| 4982.8 Na | – | – | – | – | W |

Table 9

SrCl$_2$.6H$_2$O

[Conc., 1,000 p.p.m.]

| Flame | H$_2$+F$_2$ | H$_2$+ClO$_3$F | | | C$_2$H$_2$+O$_2$ | | |
|---|---|---|---|---|---|---|---|
| Solvent | H$_2$O | H$_2$O | DMF | DMS | H$_2$O | DMF | DMS |
| Wave length A.: | | | | | | | |
| Atomic lines: | | | | | | | |
| 4607.3 Sr | V.S. | M | W | W | V.S. | V.S. | V.S. |
| 4215.5 Sr | M | W | W | W | M | M | S |
| 4077.7 Sr | M | W | W | W | M | M | S |
| Molecular bands: | | | | | | | |
| 6800 SrO | – | – | – | – | M | M | M |
| 6650 SrO | – | – | – | – | M | M | M |
| 6450 SrO | – | – | – | – | W | M | M |
| 6050 SrO | – | – | – | – | V.S. | V.S. | V.S. |
| 5950 SrO | – | – | – | – | M | – | – |
| 6800 SrF | W | W | – | – | – | – | – |
| 6632.7 SrF | V.S. | M | W | W | – | – | – |
| 6512 SrF | V.S. | M | W | W | – | – | – |
| 6419 SrF | M | M | W | W | – | – | – |
| 6309.1 SrF | M | M | W | W | – | – | – |
| 6050 SrF | M | M | W | W | – | – | – |
| 5779.5 SrF | V.S. | S | M | M | – | – | – |
| 5650 SrF | W | W | – | – | – | – | – |

EXAMPLE 2

The calcium content of a limestone sample is determined using the method described in Example 1. A weighed sample is digested in 1:1 HCl and finally evaporated to dryness and baked at 110° C. for one hour. The solids are broken up in 1:5 HCl, filtered and the filtrate evaporated to dryness and again baked. Again the solids are extracted with dilute HCl and filtered. The removal of silica is thus accomplished. The filtrate obtained is a dilute solution of the chlorides of Ca, Mg, Fe and Al. The solution is diluted to an appropriate strength using volumetric glassware and a sample is atomized into the hydrogen-perchloryl flame. By comparison with the observed flame emission of standard solutions of Ca and Mg prepared in aqueous HCl solution, of similar strength, the concentrations of Ca and Mg in the unknown limestone are determined.

EXAMPLE 3

Using the method described in Example 2, samples of unknown materials whose metallic element content it is desired to determine, such as ores, cements, slags and so on, can be prepared by the procedures described in Example 2 into solutions which can be atomized into the hydrogen-perchloryl fluoride flame and excited so that the spectra of the ions and molecules present can be observed and recorded. By means of calibrated standards the quantitative content of the various metallic elements in the material, including Mg and Ca in the presence of each other, may thus readily be determined.

EXAMPLE 4

A solution containing 500 p.p.m. each of Ca and Mg in dimethylformamide was contacted with the hydrogen-perchloryl fluoride flame in a Beckman Instruments, Inc., spectrophotometer. The spectrum characteristic of each of the elements, obtained at a slit width of 0.15 mm., is shown in Table 10. The quantitative determination of the amounts of Mg and Ca elements present in the solution could be confirmed by comparing the percent transmittance at the various wavelengths of emission spectra obtained by using solutions containing known concentrations of the element with those obtained and shown in the table.

*Table 10*

[Material: Ca and Mg elements in dimethylformamide]

| Wave length, Å. | Percent transmittance | | Intensity rating | |
|---|---|---|---|---|
| | Mg | Ca | Mg | Ca |
| 3570 | 19.0 (MgF) | | M | — |
| 3680 | 12.0 (MgCl) | | W | — |
| 3775 | 29.0 (MgCl) | | S | — |
| 3810 | 12.5 (MgCl) | | W | — |
| 4200 | | 8.0 (Ca) | — | W |
| 5325 | | 89.0 (CaF) | — | V.S. |
| 5500 | | 35.0 (CaF) | — | S |
| 5800 | | 30.0 (CaF) | — | S |
| 5870 | | 77.0 (CaCl) | — | V.S. |
| 6000 | | Off scale (CaF) | — | V.S. |
| 6130 | | 93.0 (CaCl) | — | V.S. |

EXAMPLE 5

Natural gas (1040 B.t.u.) was mixed with perchloryl fluoride gas and ignited. The ratio of gases was adjusted until a flame of the optimum temperature was obtained. The flame was pale blue and had a white inner cone. The flame was not as hot as that obtained with the hydrogen-perchloryl fluoride flame of Examples 1–4. The emission spectra lines for the alkali metals were clearly distinguishable at a slit width of 0.2 mm.

Many widely different embodiments of this invention may be made without departing from the scope and spirit of it, and it is to be understood that my invention includes also such embodiments and is not to be limited by the above description.

I claim:

1. A method for the quantitative determination in a material of the content of a metal element forming a refractory metal oxide and selected from the group consisting of Al, Ba, Ca, Cr, Cu, Fe, Mg and Sr which comprises exciting said material in a flame photometer by means of a flame derived from a flame source consisting essentially of perchloryl fluoride and a fuel selected from the group consisting of hydrogen, natural gas, manufactured gas, and mixtures of natural and manufactured gases measuring the intensities of energy emitted by the spectral lines of the metal fluorides and chlorides formed in the flame and comparing the spectral lines and their intensities with those of a material containing a known amount of said metal element.

2. The method according to claim 1 in which the metal element is Mg.

3. The method according to claim 1 in which the metal element is Ca.

4. The process according to claim 1 in which the material is dissolved in an organic solvent selected from the group consisting of dimethylformamide, dimethylsulfoxide, and a mixture of glacial acetic acid and chloroform in the proportion of 1:1 by volume.

5. The method according to claim 1 wherein the fuel is hydrogen.

6. The method according to claim 1 wherein the fuel is natural gas.

7. In the method for the quantitative determination by flame photometry of Mg and Ca ions in the presence of each other the step which comprises contacting a solution containing said ions with a hydrogen-perchloryl fluoride flame.

References Cited in the file of this patent

UNITED STATES PATENTS

| 2,276,690 | Germany | Oct. 20, 1939 |
| 2,247,625 | Willenborg | July 1, 1941 |
| 2,585,901 | Dieke | Feb. 19, 1952 |
| 2,811,891 | Roddy | Nov. 5, 1957 |
| 2,918,125 | Sweetman | Dec. 22, 1959 |
| 2,942,947 | Engelbrecht | June 28, 1960 |

OTHER REFERENCES

Bulloff: Chem. Abstr., vol. 50, 1956, page 13639d.
Gaydon: "The Spectroscopy of Flames," 1957, pages 218–219.